US007199083B2

(12) United States Patent
Zevallos

(10) Patent No.: US 7,199,083 B2
(45) Date of Patent: Apr. 3, 2007

(54) SELF-GENERATING FOAMED DRILLING FLUIDS

(75) Inventor: Manuel Legendre Zevallos, Tabasco (MX)

(73) Assignee: Self Generating Foam Incoporated, Houston, TX (US)

( * ) Notice: Subject to any disclaimer, the term of this patent is extended or adjusted under 35 U.S.C. 154(b) by 361 days.

(21) Appl. No.: 10/313,344

(22) Filed: Dec. 6, 2002

(65) Prior Publication Data

US 2004/0110643 A1 Jun. 10, 2004

(51) Int. Cl.
*C09K 8/38* (2006.01)

(52) U.S. Cl. ............. 507/102; 507/202; 507/103; 507/120; 507/112; 507/113; 507/114; 507/110; 507/138; 507/140; 507/141; 507/145; 166/309

(58) Field of Classification Search ........... 507/102, 507/202, 103, 120, 112–114, 110, 138, 140, 507/145, 141; 166/309
See application file for complete search history.

(56) References Cited

U.S. PATENT DOCUMENTS

| | | | |
|---|---|---|---|
| 3,155,178 A | 11/1964 | Kirkpatrick et al. | |
| 3,251,417 A | 5/1966 | Holman et al. | |
| 3,297,098 A | 1/1967 | Elman et al. | |
| 3,410,344 A | 11/1968 | Cornelius | |
| 3,591,394 A | 7/1971 | Digglemann et al. | 106/87 |
| 3,958,638 A | 5/1976 | Johnston | 166/294 |
| 3,977,470 A | 8/1976 | Chang | 166/270.1 |
| 4,121,674 A | 10/1978 | Fischer et al. | 175/66 |
| 4,142,909 A | 3/1979 | Gaines | 106/87 |
| 4,219,083 A | 8/1980 | Richardson et al. | 166/300 |
| RE30,395 E | 9/1980 | Wright et al. | |
| 4,232,741 A * | 11/1980 | Richardson et al. | 166/281 |
| 4,267,887 A | 5/1981 | Watanabe | 166/300 |
| 4,289,633 A | 9/1981 | Richardson et al. | 252/8.55 B |
| 4,304,298 A | 12/1981 | Sutton | 166/293 |
| 4,333,764 A | 6/1982 | Richardson | 106/87 |
| 4,340,427 A | 7/1982 | Sutton | 106/87 |
| 4,367,093 A | 1/1983 | Burkhalter et al. | 106/87 |
| 4,450,010 A * | 5/1984 | Burkhalter et al. | 106/673 |
| 4,565,578 A | 1/1986 | Sutton et al. | 106/87 |
| 4,624,314 A * | 11/1986 | Clark | 166/271 |
| 4,692,269 A | 9/1987 | Kmiec et al. | 252/350 |
| 4,741,401 A | 5/1988 | Walles et al. | 166/300 |
| 4,813,484 A | 3/1989 | Hazlett | 166/270 |
| 4,832,123 A | 5/1989 | Abou-Sayed et al. | 166/281 |
| 4,844,163 A * | 7/1989 | Hazlett et al. | 166/270 |
| 5,105,884 A | 4/1992 | Sydansk | 166/270 |
| 5,373,901 A | 12/1994 | Norman et al. | 166/300 |
| 5,495,891 A | 3/1996 | Sydansk | 166/295 |
| 5,552,377 A | 9/1996 | Kindred | 507/209 |
| 5,591,699 A | 1/1997 | Hodge | 507/213 |
| 5,613,558 A | 3/1997 | Dillenbeck, III | 166/293 |
| 5,639,715 A | 6/1997 | Patel | 507/135 |
| 5,658,380 A | 8/1997 | Dillenbeck, III | 106/823 |
| 5,706,895 A * | 1/1998 | Sydansk | 166/294 |
| 5,780,395 A * | 7/1998 | Sydansk | 507/202 |
| 5,789,352 A | 8/1998 | Carpenter et al. | 507/209 |
| 5,962,808 A | 10/1999 | Lundstrom | 149/19.1 |
| 5,990,052 A | 11/1999 | Harris | 507/214 |
| 5,996,693 A | 12/1999 | Heathman | 166/291 |
| 6,035,933 A | 3/2000 | Khalil et al. | 166/263 |
| 6,063,737 A | 5/2000 | Haberman et al. | 507/261 |
| 6,063,738 A | 5/2000 | Chatterji et al. | 507/269 |
| 6,121,215 A * | 9/2000 | Rau | 510/130 |
| 6,123,159 A | 9/2000 | Brookey et al. | 175/72 |
| 6,138,760 A | 10/2000 | Lopez et al. | 166/300 |
| 6,162,839 A | 12/2000 | Klauck et al. | 521/83 |
| 6,209,646 B1 | 4/2001 | Reddy et al. | 166/300 |
| 6,268,314 B1 | 7/2001 | Hughes et al. | 507/202 |
| 6,270,565 B1 | 8/2001 | Heathman | 106/696 |

(Continued)

FOREIGN PATENT DOCUMENTS

RU      2047642      11/1995

OTHER PUBLICATIONS

R. Bullock et al., *New-Generation Underbalanced Drilling 4-Phase Surface Separation Technique Improves Operational Safety, Efficiency, and Data Management Capabilities*, SPE/IADC 72153, Oct. 8-9, 2001.

J. Cameron et al., *The Effect of Drilling Fluid Density and Underbalanced Drilling on Formation Damage Minimization*, Amoco Drilling Technology—EPTG (F95-P-84), Sep. 11, 1995.

G. Chitty et al., *Chase Studies in Underbalanced Drilling with Oxygenated Fluids*, World Oil, Mar. 2000.

(Continued)

*Primary Examiner*—Philip C. Tucker
(74) *Attorney, Agent, or Firm*—Keith B. Willhelm

(57) ABSTRACT

Self-generating foamed fluids for circulation through a well during drilling operations and methods for circulating such self-generating foamed drilling fluids are provided for. The drilling fluid comprises an aqueous solvent, a polymer, a surfactant, a first foam generating agent, and a second foam generating agent. The first and second foam generating agents react to generate a gas within the drilling fluid and thereby to foam the drilling fluid. Preferably, the foam generating agents are selected such that they react to generate carbon dioxide. Preferably a base fluid comprising excess amounts of only one of the foam generating agents is pumped into the drill string using a hydraulic pump. The other foam generating agent then is injected in a controlled manner downstream of the circulation pump such that the drilling fluid is foamed after being pumped for circulation through the well. The novel drilling fluids preferably have a density of from about 5.8 lb/gal to about 0.83 lb/gal, and most preferably, from about 3.3 lb/gal to about 0.83 lb/gal.

60 Claims, No Drawings

U.S. PATENT DOCUMENTS

| | | | | |
|---|---|---|---|---|
| 6,302,209 | B1 | 10/2001 | Thompson, Sr. et al. | 166/305 |
| 6,715,553 | B2* | 4/2004 | Reddy et al. | 166/309 |
| 6,722,434 | B2* | 4/2004 | Reddy et al. | 166/292 |
| 2001/0016561 | A1* | 8/2001 | Hayatdavoudi | 507/100 |
| 2002/0061831 | A1* | 5/2002 | Kaziska et al. | 510/446 |

OTHER PUBLICATIONS

B. Gedge, *Underbalanced Drilling Gains Acceptance in Europe and the International Arena*, SPE/IADC 52833, Mar. 9-11, 1999.

D. Hannegan et al., *Technologies Manage Well Pressures*, The American Oil & Gas Reporter, Sep. 2001.

D. Hannegan et al., *Underbalanced Drilling—Perceptions and Realities of Today's Technology in Offshore Applications*, SPE/IADC 74448, Feb. 26-28, 2002.

A. Lage et al., *Drilling with Aerated Drilling Fluid from a Floating Unit. Part 2: Drilling the Well*, SPE/IADC 71361, Sep. 30-Oct. 3, 2001.

E. Nakagawa et al., *Application of Aerated-Fluid Drilling in Deepwater*, SPE/IADC 52787, Mar. 9-11, 1999.

D. Park et al., *Planning and Implementation of the Repsol-YDF-MAXUS Krisna Underbalanced Drilling Project*, SPE/IADC 67689, Feb. 27-Mar. 1, 2001.

H. Santos et al., *Drilling with Aerated Fluid from a Floating Unit. Part 1: Planning, Equipment, Tests, and Rig Modifications*, SPE/IADC 67748, Feb. 27-Mar. 1, 2001.

D. Velazques Cruz et al., *Underbalanced Drilling Analysis of Naturally Fractured Mexican Fields Through 2D Multiphase Flow*, SPE/IADC 59054, Feb. 1-3, 2000.

T. Wilkes, *Right Fluid Critical to UBD Success*, The American Oil & Gas Reporter, Aug. 1999.

*Underbalanced Drilling*, Petroleum Technology Transfer Council, Jul. 11, 2001.

*Underbalanced Drilling in Marine Environments*, Petroleum Technology Transfer Council—Texas, Jul. 2002.

*Untitled Powerpoint™ Slide Show*, Drilling Contactor, May/Jun. 2000.

*Use of Underbalanced Drilling Technology Expands*, Drilling Contractor, Jan./Feb. 2001.

Newpark Drilling Fluids Webpages, Nov. 24, 2002.

M1 Drilling Fluids Manual, Chapter 21D—*Air Drilling* (Rev. No. A-O, Mar. 31, 1998).

Dowell Drilling Fluids Manual, Section 7—*Pneumatic Drilling Fluids* (Rev. Jun. 1994).

\* cited by examiner

SELF-GENERATING FOAMED DRILLING FLUIDS

FIELD OF THE INVENTION

The present invention relates to fluids used in oil and gas well drilling operations and, and more particularly, to low density, self-generating, foamed drilling fluids suitable for use in fragile, highly porous, and low pressure oil bearing formations.

BACKGROUND OF THE INVENTION

Hydrocarbons, such as oil and gas, may be recovered from various types of subsurface geological formations. Such formations typically consist of a porous layer, such as limestone and sands, overlaid by a nonporous layer. Hydrocarbons cannot rise through the nonporous layer, and thus, the porous layer forms a reservoir in which hydrocarbons are able to collect. A well is drilled through the earth until the hydrocarbon bearing formation is reached. Hydrocarbons then are able to flow from the porous formation into the well.

In conventional drilling processes, a drill bit is attached to a series of pipe sections referred to as the drill string. The drill string is rotated and, as the drilling progresses, it is extended by adding more pipe sections. Larger diameter pipes, or casings, also are placed and cemented in the well to prevent the sides of the well from caving in. Once an appropriate depth has been reached, the casing is perforated at the level of the oil bearing formation. If necessary, various completion processes then are performed to enhance the ultimate flow of oil from the formation. The drill string is withdrawn and replaced with a production string. Valves and other production equipment are connected to the well so that the hydrocarbons may flow in a controlled manner from the formation, into the cased well bore, and through the production string up to the surface for storage or transport.

As a well bore is drilled deeper and passes through hydrocarbon producing formations, the production of hydrocarbons must be controlled until the well is completed and the necessary production equipment has been installed. The most common way of controlling production during the drilling process is to circulate a drilling fluid or "mud" through the well bore. Typically, the fluid is pumped down the drill string, through the bit, and into the well bore. The hydrostatic pressure of the drilling fluid in the well bore relative to the hydrostatic pressure of hydrocarbons in the formation is adjusted by varying the density of the drilling fluid, thereby controlling the flow of hydrocarbons from the formation.

Drilling fluids, however, are used for a variety of other purposes. As the drill string is rotated and the bit cuts through the earth, a tremendous amount of heat and large quantities of cuttings are generated. The drilling fluid serves to lubricate and cool the drill bit. As it is recirculated back up the well bore, the drilling fluid also carries cuttings away from the bit and out of the well bore. The drilling fluid also helps stabilize uncased portions of the well bore and prevents it from caving in.

Traditionally, drilling has been conducted in an overbalanced condition, that is, the hydrostatic pressure of drilling fluid in the well bore exceeds the pressure of hydrocarbons in the formation. Hydrocarbons, therefore, are prevented from flowing into the well bore. This avoids the risk that the well will blow-out and damage the environment and drilling equipment or injure those working on the drilling rig.

A major consequence of overbalanced drilling operations is that drilling fluid can flow from the well bore into the formation. That flow of fluid at relatively low levels is referred to as seepage and, at higher levels, as lost circulation. Seepage, and especially lost circulation, in turn may have several deleterious and costly effects. First, and obviously, any drilling fluid that flows into the formation must be replaced in order to maintain circulation of fluid through the well. The amount and cost of drilling fluid required to drill the well, therefore, is increased.

Moreover, drilling fluids typically comprise a variety of additives designed to improve the chemical and physical properties of the fluid. Seepage and lost circulation of drilling fluid necessarily carries with it whatever components are in the drilling fluid. It also carries fine cuttings generated by the drill bit. The cuttings, and many of the other components in the drilling fluid, however, can decrease the permeability of the formation. It then is more difficult for oil to flow from the formation once drilling is completed and production is started. Decreased permeability also may require acidizing or fracturing the hydrocarbon bearing formation to enhance production from the formation, which will further increases costs.

At high levels of lost circulation, differential sticking also may occur. That is, the drill string will be pulled against the wall of the bore hole by fluid flowing into the formation. Once stuck, the drill string can no longer rotate, and it is often difficult and time consuming to free the string so that drilling may resume.

The problems associated with seepage and lost circulation may be addressed by adjusting the density of the drilling fluid. Drilling fluids most commonly are high-density dispersions of fine, inorganic solids, such as clay and barite, in an aqueous liquid or hydrocarbon liquid. The density of the fluids may be controlled by the amount of solids added and, therefore, adjusted to balance the hydrostatic pressures at the interface between the well bore and the formation. Seepage and lost circulation and their attendant problems also may be addressed by the formation of a filter cake on the wall of the well bore or by the addition of filtration control and seepage control additives designed to physically impede the flow of fluid into the well bore.

Such drilling fluids are suitable for use in a wide variety of hydrocarbon bearing formations. In many formations, however, the hydrostatic pressure of hydrocarbons in the formation is relatively low, often because the formation is depleted. Many drilling fluids are simply too heavy for low pressure formations. They can significantly overbalance the well, allowing excessive amounts of drilling fluid to flow into the formation. The problems caused by seepage and lost circulation are exacerbated when a low pressure formation is also relatively fragile, such as are the fractured limestone formations found in the breccia of the Paleocene in many parts of the world. Fragile formations may be excessively fractured by the hydrostatic pressure of drilling fluid flowing into the formation and carry even more materials into the formation that will diminish its permeability. Seepage and lost circulation materials, in particular, if they are carried into the formation can cause extensive damage to the formation.

Accordingly, it is often preferable to drill through formations that are highly permeable, that have low pressures, or that are fragile in a near balanced or underbalanced state. That is, the hydrostatic pressure of the fluid in the well bore will be approximately equal to or less than the hydrostatic pressure of the formation, and various lower density drilling fluids have been developed for such purposes.

For example, low density diesel-water emulsions have been used as drilling fluids in fractured limestone formations. Those fluids comprise an emulsion of from about 75 to 85% diesel and from about 25 to 15% water and may have densities as low as about 7.0 lb/gal. Though lighter than dispersed solids formulations, those diesel-water emulsion fluids still are too heavy for such formations. Lost circulation can range from 3,000 to as high as 100,000 barrels of drilling fluid per well. Especially in those quantities, lost circulation greatly increases the costs of drilling fluid, complicates the logistics of supplying drilling fluid to the rig, and can cause extensive damage to the formation.

The effective density of drilling fluids may be lowered somewhat by aerating the fluid. Such fluids typically consist of conventional clay or polymer fluids lightened by injecting air, nitrogen or carbon dioxide. They may have densities as low as about 6.2 lb/gal, which may be lowered further, to around 5.8 lb/gal, by the addition of plastic or glass microspheres. Aerated fluids, however, still are too heavy for use in extremely low pressure, fragile formations without substantial losses. For example, in fractured limestone formations such as those in the Cantarell field offshore of Mexico, the drilling fluid must have a density of from about 4.2 to about 5.0 lb/gal in order to balance the well.

Such densities may be achieved by using foamed drilling fluids. They typically comprise a surfactant solution with gas dispersed therein. The surfactant acts to stabilize the gas dispersion. For environmental reasons, aqueous systems are preferred, and they typically include a polymer to improve the rheological and thioxotropic properties of the foam. Many types of foamed fluids are known, such as the aqueous, polymer based foamed drilling fluids disclosed in U.S. Pat. No. 5,706,895 to R. Sydansk. Foamed drilling fluids chemically are more complex and, therefore, their chemical and physical properties are somewhat more difficult to control.

In general, however, such foamed drilling fluids perform quite well in drilling operations and offer several advantages over traditional suspended solids drilling fluids. For example, the density of the foam may be controlled relatively easily by adjusting the gas injected into the foam. Also, the ability of foamed drilling fluids to carry cuttings away from a drilling bit is much greater than that of liquid drilling fluids. More effective removal of cuttings allows drilling to proceed at a faster pace, thereby reducing the time and expense of drilling. Moreover, when used at near balanced or underbalanced conditions, foamed drilling fluids can effectively prevent damage to even highly fragile, highly permeable formations.

Foamed drilling fluids are prepared by mixing a liquid phase, such as a polymer-surfactant solution, and a gas phase, such as nitrogen. Typically, this has been done by high velocity mixing of the phases or by injecting gas into the liquid phase through a small orifice. Most commonly, the foam is generated at the surface and then pumped into the well bore. It also has been suggested that drilling fluids may be foamed by pumping separate liquid and gas streams through a drill string to a downhole foam generator.

Foamed drilling fluids, therefore, typically require a source of gas such as nitrogen and various additional equipment that is not needed in conventional liquid circulation systems. For example, if liquid nitrogen is used, special tanks and equipment for cryogenically storing and handling the liquid nitrogen are required. Alternately, nitrogen membrane units may be used to produce nitrogen gas, although the gas produced thereby is only approximately 95% pure. Foam circulation systems also may include compressors, storage tanks, air pumps, foam generators, and other equipment beyond that commonly employed for circulating liquids. Moreover, unlike many other drilling fluids, which are hydraulic, foamed fluids are pneumatic. Special pneumatic pumps and control heads may have to be used to pump or otherwise control the foam in the well bore. Thus, systems for preparing and circulating foamed drilling fluids are relatively costly and require more maintenance, control, and logistical support than those required for more traditional suspended solids drilling fluids.

Such problems are exacerbated in offshore drilling operations where maintenance and logistical support is more difficult and costly. Space also is at a premium in offshore operations. On land, there usually is adequate space for additional equipment. Offshore, however, valuable space on the drilling rig deck is required, or it may be necessary to provide a barge or support boat to accommodate a foam circulation system. That can add considerable cost to the drilling operation.

An object of this invention, therefore, is to provide drilling fluids and, in particular, low density foamed drilling fluids that may be used in formations that are highly permeable, that have low pressures, or that are fragile without substantial lost circulation.

It also is an object to provide low density foamed drilling fluids having chemical and physical properties suitable for use in drilling operations.

Another object of this invention is to provide low density foamed drilling fluids that may be more easily and economically prepared and circulated in drilling operations.

Yet another object is to provide systems for circulating low density foamed drilling fluids that are simpler and require less specialized equipment and space for their installation and operation.

It is a further object of this invention to provide such drilling fluids and systems wherein all of the above-mentioned advantages are realized.

Those and other objects and advantages of the invention will be apparent to those skilled in the art upon reading the following detailed description and upon reference to the drawings.

SUMMARY OF THE INVENTION

The subject invention provides for self-generating foamed fluids for circulation through a well, such as those used to produce hydrocarbons and steam, during drilling operations and methods for circulating such self-generating foamed drilling fluids. The drilling fluid comprises an aqueous solvent, a polymer, a surfactant, a first foam generating agent, and a second foam generating agent. The first and second foam generating agents react to generate a gas within the drilling fluid and thereby to foam the drilling fluid. Preferably, the foam generating agents are selected such that they react to generate carbon dioxide.

Because the novel fluids self-generate a foam, it is not necessary to inject gas or to provide equipment for generating and storing gas or for foaming the fluid. Particularly in offshore operations, where space on a drilling rig is at a premium, this creates substantial savings in both material and operating costs.

Preferably a base fluid comprising excess amounts of only one of the foam generating agents is pumped into the drill string using a conventional hydraulic mud circulation pump. The other foam generating agent then is injected in a controlled manner downstream of the circulation pump such that the drilling fluid is foamed after being pumped for circulation through the well. In this manner the amount of gas generated and, therefore, the density of the drilling fluid may be more precisely controlled, and the circulation of the foamed drilling fluid through the well is facilitated.

Preferably, the drilling fluid has a density of from about 5.8 lb/gal to about 0.83 lb/gal, and most preferably, from about 3.3 lb/gal to about 0.83 lb/gal. It will be appreciated, therefore, that the novel self-generating foamed drilling fluids have sufficiently low densities for use in underbalanced drilling through fragile and low pressure formations.

DESCRIPTION OF ILLUSTRATIVE EMBODIMENTS

The self-generating foamed drilling fluids of the subject invention comprise an aqueous solvent, a polymer, a surfactant, a first foam generating agent, and a second foam generating agent. The first foam generating agent reacts with the second foam generating agent to generate a gas within the drilling fluid and thereby to foam the drilling fluid. It will be appreciated, therefore, that the novel foams are self-generating. That is, the foam is generated by the chemical release of gas from the liquid phase and not by physically mixing a gas into a liquid. Because the novel foamed drilling fluids are self-generating, the systems required for circulating them through a well are much simpler and more economically operated.

The aqueous solvent of the drilling fluid may be any aqueous liquid capable of forming a solution with the selected polymer and the other components of the drilling fluid. The term "solution" as used herein, encompasses dispersions, emulsions, or any other substantially homogeneous mixture, as well as true solutions. The solvent preferably is either fresh water or brine.

Polymers

The polymer component of the novel foamed drilling fluids primarily serves to enhance the viscosity of the drilling fluid such that it is capable of lubricating the drill bit and carry cuttings away from the drill bit to the surface. Accordingly, polymers useful in the novel drilling fluids include substantially any water-soluble, viscosity-enhancing polymer of the type conventionally used in drilling fluids. A variety of such polymers are known to workers in the art and may be used in the subject invention.

For example, the polymer component may be either a biopolymer or a synthetic polymer. Suitable biopolymers may be selected from the group consisting of polysaccharides and modified polysaccharides, such as xanthan gum, guar gum, wellum gums, gellan gums, succinoglycan, succinoglycan polysaccharides, scleroglycan, schleroglucan polysaccharides, polyvinylsaccharides, o-carboxychitosans, polyanionic cellulose, carboxymethylcellulose, hydroxyethylcellulose, hydroxypropylcellulose, and modified starches, and mixtures thereof, or consisting of any subgroup of the foregoing.

Suitable, synthetic polymers may be selected from the group consisting of polyvinyl alcohol, polyethylene oxide, polyvinyl pyrrolidone, and acrylamide polymers, aluminum and mixed metal hydroxide silicates, and mixtures thereof, or consisting of any subgroup of the foregoing. Preferred acrylamide polymers may be selected from the group consisting of polyacrylamide ("PA", i.e., acrylamide homopolymer having substantially less than about 1% of its acrylamide groups converted to carboxylate groups), partially hydrolyzed polyacrylamide ("PHPA", i.e., acrylamide homopolymers having more than about 1%, but not 100%, of its acrylamide groups converted to carboxylate groups), acrylamide copolymers, acrylamide terpolymers containing acrylamide, a second species, and a third species, and acrylamide tetrapolymers containing acrylamide, acrylate, a third species, and a fourth species, and mixtures thereof, or consisting of any subgroup of the foregoing.

The average molecular weight of an acrylamide polymer is generally from about 10,000 and about 50,000,000, preferably is from about 250,000 to about 20,000,000, and most preferably is from about 1,000,000 to about 18,000,000.

Preferably, the polymer is a mixture of xanthan gum and polyanionic cellulose ("PAC").

The concentration of the polymer in the liquid phase of the foam is generally from about 1 to about 12 lb/bbl of the polymer and, preferably, is from about 4 to about 8 lb/bbl of the polymer.

Surfactants

The surfactant component of the novel foamed drilling fluids primarily serves to stabilize air bubbles formed by the generation of gas when the foam generating agents react. Accordingly, the surfactant of the novel drilling fluids is substantially any water-soluble agent suitable for oilfield use that is compatible with the polymer component and acts to stabilize the gas dispersion. A variety of such surfactants is known to workers in the art and may be used in the subject invention.

For example, the surfactant may selected from the group consisting of anionic, cationic, and nonionic surfactants, and mixtures thereof, or consisting of any subgroup of the foregoing. Preferred surfactants may be selected from the group consisting of ethoxylated alcohols, ethoxylated sulfates, refined sulfonates, petroleum sulfonates, and is alpha olefin sulfonates, and mixtures thereof, or consisting of any subgroup of the foregoing. Most preferably, the surfactant is a mixture of an anionic and a non-ionic surfactant.

The concentration of surfactant in the liquid phase of the foam is generally from about 1 to about 10 lb/bbl of the surfactant and, preferably, is from about 4 to about 6 lb/bbl of the surfactant.

Foam Generating Agents

The foam generating agents primarily serve to generate a gas which in turn foams the drilling fluid. Accordingly, the foam generating agents of the novel drilling fluids are substantially any agents that are capable of forming an aqueous solution and generating a gas at sufficient rates and in sufficient quantities to foam the drilling fluid. Preferably, the gas is nontoxic and noncombustible. It also is preferably generated at a manageable pH level, as drilling fluids having an excessively high or low pH give rise to various well known problems. A variety of conventional chemical compositions suitable for such purposes is known to workers in the art and may be used in the subject invention.

The first and second foaming agents will react in aqueous solutions to generate a gas which may be selected from the group consisting of carbon dioxide, oxygen, nitrogen, sulfur dioxide, nitrogen dioxide, and ammonia, and mixtures thereof, or consisting of any subgroup of the foregoing. Carbon dioxide, however, is preferred because it is nontoxic and may be generated at low temperatures and at a manageable pH. While they may be generated in an aqueous solution and are believed capable of foaming a drilling fluid, oxygen generally will not be preferred because it is explosive, ammonia is less preferred because it is toxic, and nitrogen suffers the disadvantage that it requires relatively high temperatures for its generation. Additional precautions and expense generally will be to required in order to utilize such gases and, as a practical matter, their use may be precluded by safety, health, or cost reasons.

Accordingly, the first foam generating agent may be selected from the group consisting of acid and neutral salts of alkali metals and alkaline earth metals, and mixtures thereof, or consisting of any subgroup of the foregoing. Such agents are preferred because they are relatively inexpensive and are capable of generating carbon dioxide, which is the preferred foaming gas. Preferably, the first foam generating agent is selected from the group consisting of sodium bicarbonate, potassium bicarbonate, calcium bicarbonate, barium bicarbonate, and lithium bicarbonate, and mixtures thereof, or consisting of any subgroup of the foregoing. Most preferably, the first foam generating agent is sodium bicarbonate.

The second foam generating agent may be selected from the group consisting of organic and inorganic acids, and mixtures thereof. Organic acids suitable for use as the second foam generating agent preferably are selected from the group consisting of carboxylic acids, acetic acids, acetyl salicylic acids, ascorbic acids, citric acids, lactic acids, tartaric acids, gluconic acids, phenyl glycolic acids, benzylic acids, malic acids, salicylic acids, acetyl salicylic acids, formic acids, propionic acids, butyric acids, oleic acids, linoleic acids, linolenic acids, sorbic acids, benzoic acids, phenyl acetic acids, gallic acids, oxylacetic acids, valeric acids, palmitic acids, fatty acids, valproic acids, acrylic acids, and methacrylic acids, and mixtures thereof, or consisting of any subgroup of the foregoing. Inorganic acids suitable for use as the second foam generating agent preferably are selected from the group consisting of hydrochloric acids, sulfuric acids, nitric acids, sulfonitric acids, polyphosphoric acids, chlorosulfuric acids, and boric acids, and mixtures thereof, or consisting of any subgroup of the foregoing. Most preferably, the second foam generating agent is 2-hydroxy-1,2,3,propanetricarboxylic acid, citric acid, or mixtures thereof.

The concentration of the foam generating agents in the liquid phase of the foam is generally from about 0.1 to about 20 lb/bbl of the first foam generating agent and from about 0.1 to about 20 lb/bbl of the second foam generating agent. Preferably, the novel drilling fluids comprise from about 3 to about 10 lb/bbl of the first foam generating agent and from about 2 to about 8 lb/bbl of the second foam generating agent.

Additives

Preferably the novel drilling fluids will comprise various additives that enhance the efficacy of the fluid. For example, they may comprise additives designed to prevent the flow of fluid into the formation, such as additives capable of forming a filter cake, seepage loss additives, and lost circulation additives. As will be appreciated by workers in the art, filter cakes are commonly used in drilling fluids to stabilize the uncased portion of the well bore and to protect the formation from contamination by the drilling fluid. Additives suitable for forming a filter cake on the surface of the uncased well bore and useful in the novel drilling fluids include calcium carbonate, bentonite, lignites, sulfonated asphalt, and various polymers. Even in underbalanced operations, the drilling fluid preferably will comprise filter cake additives as the presence of a filter cake will protect the formation in the event that the well inadvertently becomes overbalanced.

While the novel drilling fluids may be used to greatest advantage in underbalanced operations, they also may be used in near balanced or overbalanced drilling. For such applications, there is a greater risk of fluid flowing into the formation. Accordingly, it may be appropriate to add seepage loss additives, such cellulose fibers, and lost circulation materials, such as nut hulls and various coarse fibrous materials, to the drilling fluid. In any event, the use of filter cake additives, seepage loss additives, and lost circulation additives is well understood by workers in the art and may be used, if desired or appropriate, in the novel fluids.

The novel drilling fluids also preferably comprise a rheological stabilizer. Rheological stabilizers are commonly used in drilling fluids, as will be appreciated by workers in the art, to thin, disperse, or otherwise control the flow properties of the fluid. Suitable rheological stabilizers useful in the novel drilling fluids include magnesium oxide, lignosulfonate, and acrylic polymers. Other compositions suitable for use as rheological stabilizers in drilling fluids are known to workers in the art and may be used in the subject invention. Suitable rheological stabilizers may be manufactured by methods well known in the art and are commercially available from most drilling fluid companies.

The novel drilling fluids, as compared to other aqueous drilling fluids, has a relatively low pH. That may make them more suitable as a substrate for bacterial growth. Accordingly, the novel drilling fluids also preferably comprise a biocide. Suitable biocides useful in the novel drilling fluids include formaldehydes, paraformaldehydes, glutaraldehyde, and isothiazolones. Other biocides suitable for use in drilling fluids are known to workers in the art and may be used in the subject invention. They may be manufactured by methods well known in the art and are commercially available from a number of sources.

Also because the novel drilling fluids have a relatively low pH, they may be more likely to corrode the drilling equipment. Accordingly, the novel drilling fluids also preferably comprise an anticorrosive agent. Suitable anticorrosive agents useful in the novel drilling fluids include macrofilming amines, liquid phosphonates, with or without nitrile salt, oxygen inhibitors, and oxygen scavengers. Other anticorrosive agents suitable for use in drilling fluids are known to workers in the art and may be used in the subject invention. They may be manufactured by methods well known in the art and are commercially available from a number of sources.

Other conventional additives are known to workers in the art and may, if desired, be used in the subject invention. It is generally expected that additives of the type used in aqueous, polymer based drilling fluids may be used to advantage in the novel fluids, and the desirability and compatibility of such conventional additives may be determined by routine experimentation.

Making and Using the Novel Foamed Drilling Fluids

Typical components and their concentrations in the novel fluids are described above. The choice of a particular composition among those generally suitable for use in the novel fluids and the concentration thereof, however, will depend on the precise chemical and physical properties of the foam that are needed for a particular drilling operation. Cost considerations also may come into play. Workers in the art may optimize the precise formulation of the novel fluids for a particular application by reference to principles well known in the art and by routine experimentation.

For example, the viscosity and other rheological and thixotropic properties of the novel fluids are primarily a function of the properties of the polymer component and the polymer concentration. The viscosity and degree of structure of the foam generally are increased by increasing the polymer concentration in the liquid phase. It may be more cost effective, however, to use a higher molecular weight polymer or a polymer having a higher degree of hydrolysis at a relatively fixed polymer concentration. Conversely, the viscosity and degree of structure of the foam may be reduced by using a lower molecular weight polymer, a lower polymer concentration, or, in some cases, a polymer having a lower degree of hydrolysis.

The novel fluids may be formulated to provide foams with a wide range of densities as may be appropriate for the wide range of hydrostatic pressures encountered in different formations. Because the problems of excessively heavy fluids and lost circulation are more acute when a formation is highly permeable, has low pressures, or is fragile, that is the environment in which the novel fluids may be used to greatest advantage. Accordingly, the novel fluids preferably are formulated such that they have a density of from about 5.8 lbs/gal to about 0.83 lbs/gal, or most preferably, a density of from about 3.3 lbs/gal to about 0.83 lbs/gal. Correspondingly, the novel fluids preferably will have a gas content of from about 5.0% to about 95% by volume and, most preferably, a gas content of from about 40% to about 90% by volume.

The density of the novel foamed drilling fluids will be controlled primarily by the amount of gas that is generated, which in turn is determined by the amount of foam generating agents added to the fluid. Preferably one of the foam generating agents is present in the liquid phase in excess of that required to generate the amount of gas that will give the foam its desired density. Thus, the generation of gas and, in turn, the density of the foam may be controlled by the amount and controlled addition of the other foam generating agent to the drilling fluid.

It will be appreciated, therefore, that the novel foamed drilling fluids are particularly useful in formations that are highly permeable, that have low pressures, or that are fragile without substantial lost circulation. They may be formulated to provide extremely low densities. It is possible, therefore, to balance or underbalance the hydrostatic pressures at the interface between the well bore and formation. Production from the well may thereby be controlled without allowing substantial loss of fluid into the formation.

Moreover, it will be appreciated that the novel low density foamed drilling fluids have chemical and physical properties that make them highly suitable for use in drilling operations. The rheological and thixotropic properties of the foam are primarily determined by the polymer component, and such polymers have been proven to provide excellent results in drilling fluids. The foam generating agents will have no significant effect on the physical properties of the foam. To the extent that the chemical reaction that generates the foam also lowers the pH of the fluids, if desired, the effects thereof may be counteracted by the addition of biocides, anticorrosive agents, and other known additives. Such additives are both economical and effective.

In general, the novel drilling fluids may be made and circulated by methods and equipment well known and used by workers in the art. That is, a base fluid comprising all desired components except one of the foam generating agents is admixed by conventional means. The second foam generating agent is then added to the liquid phase, for example, by conventional liquid injectors. The resulting chemical reaction between the foam generating agents generates gas to foam the fluid.

For example, the base polymer fluid may be admixed in conventional mixing tanks. That fluid, which contains only one of the foam generating agents, then is pumped with conventional hydraulic pumps from the mixing tank into the drill string. Once the base fluid has exited the pump, the other foam generating agent is introduced via a separate conduit into the base fluid. As the fluid continues downstream, it self-generates a foam, which flows down the drill string, out of the drill bit, and into the well bore. As it returns to the surface, the foam carries with it drill cuttings. Once at the surface, the cuttings are separated from the foam by conventional separators. The fluid can be defoamed, for example, by subjecting it to a water spray or passing it through another known type of defoaming apparatus. The fluid then may be reconditioned by admixing additional amounts of the first foam generating agent and other drilling fluid components, at which point is ready for recirculation and refoaming.

It is not necessary, however, to introduce one of the foam generating agents downstream of the pump that circulates the fluid toward the well. While such systems are preferred because they are simpler and avoid the need for special pneumatic pumps capable of pumping foam, both foam generating agents may be added in a mixing tank, or one of the agents added downstream of the mixing tank to generate a foam before the fluid is pumped toward the well. It is believed, however, that circulation of the fluid through the well may be controlled more efficiently and effectively if one of the foam generating agents is injected after the base fluid has been circulated toward the well by the main hydraulic circulation pump, i.e., the pump that delivers the fluid into the drill string.

It will be appreciated, therefore, that the novel foamed drilling fluids may be more easily and economically prepared and circulated in drilling operations. The cost of the foam generating agents generally will be substantially less than that of nitrogen, the gas most commonly used in conventional drilling fluids, especially when the cost and logistics of constructing and supplying circulation systems is included. Since the novel fluids self-generate a foaming gas, there is no need to generate a supply of gas or to store it. Thus, gas generators, storage tanks, air pumps and other equipment needed to generate, store, and inject gas are not necessary, as are foam generators and the like. Although the systems used to prepare and circulate the novel fluids preferably include a system for storing and delivering one of the foam generating agents into a base polymer fluid comprising the other foam generating agent downstream of a hydraulic circulation pump, such liquid injection systems are less expensive to install and operate than are those for injecting gas. Moreover, because they are simpler and, in particular, avoid the need for large, bulky gas generation and storage equipment, systems for formulating and circulating the novel fluids may be accommodated in less space. In offshore operations, it generally will not be necessary to provide a separate barge or boat to accommodate the equipment. Thus, the cost of formulating and circulating the novel fluids is significantly less than that associated with conventional foamed drilling fluids.

Also, while the novel fluids have been described for use in drilling a well bore, it will be appreciated that they also may be used to advantage in various completion, workover, or kill operations as are typically performed to enhance production from a hydrocarbon well. As used herein, therefore, drilling operations shall encompass such operations as well as the process of drilling a well bore. Moreover, while the novel fluids are particularly useful in drilling wells for hydrocarbon production, they may be used to advantage in other well drilling operations. For example, the novel fluids may be used in the drilling of geothermal wells.

It also will be appreciated that the foam generating agents are identified as first and second foam generating agents for convenience only. Thus, for example, in describing the injection of a "second" foam generating agent into a base fluid containing a "first" foam generating agent, such description also would encompass adding those foam generating agents identified above as "first" foam generating agents into a base fluid comprising "second" foam generating agents, and vice versa.

EXAMPLES

The invention and its advantages may be further understood by reference to the following examples. It will be appreciated, however, that the invention is not limited thereto.

Example 1

Generation of Gas Bubbles

An aqueous buffer solution of sodium bicarbonate was prepared and titrated with a citric acid solution to determine the pH at which carbon dioxide was generated. Specifically, 350 ml of a buffer solution comprising 10 lbs/bbl of sodium bicarbonate was titrated with a citric acid solution comprising 50 vol % of citric acid. The pH of the buffer solution was measured with an electronic glass pH meter and recorded at various intervals as the buffer solution was titrated with the citric acid solution. The results are shown below in Table 1.

TABLE 1

| Millimeters of Citric Acid (50 vol %) | pH of Solution |
|---|---|
| 0.00 | 8.21 |
| 0.50 | 7.95 |
| 1.00 | 7.69 |
| 1.50 | 7.43 |
| 1.78 | 7.30 |
| 2.06 | 7.17 |
| 2.34 | 7.04 |
| 2.60 | 6.89 |
| 3.00 | 6.83 |
| 3.40 | 6.50 |
| 3.80 | 6.50 |
| 4.20 | 6.50 |
| 4.60 | 6.50 |
| 5.00 | 6.50 |
| 5.40 | 6.50 |
| 5.40 | 6.62 |
| 5.40 | 6.74 |
| 5.40 | 6.86 |
| 5.40 | 6.98 |
| 5.40 | 7.10 |

The initial pH of the buffer solution was 8.21. The generation of carbon dioxide gas bubbles was observed after titration of 2.60 ml of citric acid solution, i.e., when the pH reached 6.89. After 3.40 ml of citric acid was titrated, the pH of the buffer solution was 6.50, and it remained there as additional citric acid solution was titrated. Titration was stopped at 5.40, at which point the pH remained at 6.50. Generation of carbon dioxide gas bubbles continued after titration was stopped, although the pH of the solution tended to rise.

From the foregoing, it will be appreciated that the generation of carbon dioxide gas bubbles in an aqueous solution may be controlled by the addition of citric acid and that gas generation may occur at a constant pH of approximately 6.50 which can be raised to approximately 7.00.

Example 2

Generation of Foam

Polymer base fluids were prepared and titrated with a citric acid solution in accordance with the subject invention to select a surfactant that best stabilized generated carbon dioxide bubbles into a foamed state. Specifically, polymer base fluids 1 and 2 were prepared in an aqueous solution. The polymer base fluids were an aqueous solution comprising a mix of xantham gum and polyanionic cellulose polymers, calcium carbonate as a fliter cake additive, sodium bicarbonate as a first foam generating agent, and a surfactant. The polymer base fluids were identical, except for the choice of surfactant.

The PAC HV polymer was a commercially available high molecular weight polyanionic cellulose. The surfactant in polymer base fluid 1 was a commercially available blend of anionic and nonionic, alcohol-ether-sulfates that is resistant to contamination by hard water and brine. The surfactant in polymer base fluid 2 was a commercially available mixture of anionic and nonionic, alcohol-ether-sulfates that is resistant to contamination by oil and by hard water and brine.

The composition of the polymer base fluids is set forth below in Table 2.

TABLE 2

| Components of Polymer Base Fluids | Concentration (lb/bbl) |
|---|---|
| Xantham Gum | 3.0 |
| PAC HV | 2.0 |
| Calcium Carbonate - 300 Mesh | 20.0 |
| Sodium Bicarbonate | 10.0 |
| Surfactant | 5.0 |

Various chemical and physical properties of the fluids were determined in accordance with API standard test methods, i.e., API-RP 13B-1, API-RP 13B-2, API-RP 13I, and API-RP 13J. Those properties are set forth below in Table 3.

TABLE 3

| Properties of Polymer Base Fluids | Polymer Base Fluid 1 | Polymer Base Fluid 2 |
|---|---|---|
| pH | 9.22 | 9.26 |
| Density (gram/cc) | 1.05 | 1.05 |
| API Filtrate (ml/30 min) | 6.50 | 6.80 |
| Chlorides (ppm) | 800.00 | 800.00 |
| Mf (ml $H_2SO_4$) | 29.00 | 28.00 |
| Marsh Viscosity (sec/qt gal) | 44.00 | 45.00 |
| Yield Point (lbs/100 sq ft) | 8.00 | 10.00 |

350 ml of each polymer base fluid then were titrated with a citric acid solution comprising 50 vol % of citric acid. The pH of the polymer base fluids were measured with an electronic glass pH meter and recorded at various intervals as fluids were titrated with the citric acid solution. The results are shown below in Table 4.

TABLE 4

| Millimeters of Citric Acid (50 vol %) | pH of Fluid A | pH of Fluid B |
|---|---|---|
| 0.00 | 9.22 | 9.26 |
| 1.00 | 9.04 | 9.06 |
| 2.00 | 8.86 | 8.87 |
| 3.00 | 8.69 | 8.67 |
| 4.00 | 8.52 | 8.48 |
| 5.00 | 8.34 | 8.28 |
| 6.00 | 8.17 | 8.09 |
| 7.00 | 7.99 | 7.89 |
| 8.00 | 7.82 | 7.70 |
| 9.00 | 7.63 | 7.50 |
| 9.30 | 7.45 | 7.34 |
| 9.70 | 7.27 | 7.18 |
| 10.00 | 7.10 | 7.02 |
| 10.50 | 6.82 | 6.80 |
| 11.00 | 6.47 | 6.50 |
| 11.50 | 6.13 | 6.20 |
| 12.00 | 5.78 | 5.90 |
| 12.50 | 5.44 | 5.62 |
| 12.50 | 5.76 | 5.89 |
| 12.50 | 6.08 | 6.16 |
| 12.50 | 6.40 | 6.43 |
| 12.50 | 6.72 | 6.70 |
| 12.50 | 7.02 | 6.98 |

The initial pH of the polymer base fluids were, respectively 9.22 and 9.26. The abundant generation of carbon dioxide gas bubbles and the formation of a foam was observed after titration of 10.50 ml of citric acid solution, i.e., when the pH reached 6.82 and 6.80, respectively. As titration continued to 12.50 ml, the pH of the polymer base fluids dropped to, respectively, 5.44 and 5.62, at which point the titration was stopped. Thereafter, the pH of both polymer base fluids tended to rise to approximately 7.00.

Abundant foam generation continued during the titration and afterwards. While both polymer base fluids generated generally satisfactory foams, the foam generated in polymer base fluid B was observed to be more abundant and stable.

From the foregoing, it will be appreciated that stable foams may be self-generated in an aqueous polymer fluid by the generation of carbon dioxide gas in the presence of a stabilizing surfactant. Moreover, the novel self-generating foams of the subject invention have a pH range that is manageable in a drilling environment.

Example 3

Chemical and Physical Properties of Novel Self-Generated Foamed Compositions

Various aqueous polymer fluids were prepared and foamed by the addition of citric acid in accordance with the subject invention. The fluids were similar to those prepared in Example 2 above in that they were aqueous solutions comprising a mix of xantham gum and polyanionic cellulose polymers, calcium carbonate as a fliter cake additive, sodium bicarbonate as a first foam generating agent, and a surfactant, and they were foamed by the addition of citric acid as a second foam generating agent.

All of the fluids utilized surfactant B, however, and incorporated magnesium oxide to stabilize the rheology and the pH of the fluids and to control the filtrate in the fluids.

The total and relative concentrations of the polymer components were varied to determine the effect thereof on the rheology and thixotropic performance of the foamed fluids. Likewise, the concentrations of the other components were varied and chemical and physical properties of the fluids both before and after foaming were determined.

The composition of the polymer fluids is set forth below in Table 5.

TABLE 5

| Components of Polymer Fluids | Concentration (lbs/bbl) | | | | |
|---|---|---|---|---|---|
| | Fluid 3 | Fluid 4 | Fluid 5 | Fluid 6 | Fluid 7 |
| Xantham Gum | 4.0 | 1.0 | 3.0 | 2.5 | 1.5 |
| PAC HV | 1.0 | 4.0 | 2.0 | 2.0 | 3.0 |
| Calcium Carbonate 300 Mesh | 10.0 | 5.0 | 20.0 | 15.0 | 15.0 |
| Sodium Bicarbonate | 10.0 | 5.0 | 10.0 | 5.0 | 5.0 |
| Surfactant B | 4.0 | 3.0 | 3.0 | 5.0 | 3.0 |
| Magnesium Oxide | 2.0 | 1.5 | 0.5 | 2.0 | 2.0 |
| Citric Acid (50% vol) | 4.0 | 4.0 | 4.0 | 4.0 | 4.0 |

The properties of the polymer fluids were determined before foaming. Those properties are set forth below in Table 6.

TABLE 6

| Properties of Polymer Fluids (Before Foaming) | Fluid 3 | Fluid 4 | Fluid 5 | Fluid 6 | Fluid 7 |
|---|---|---|---|---|---|
| pH | 9.26 | 8.50 | 9.18 | 8.60 | 8.80 |
| Density (lb/gal) | 8.67 | 8.58 | 8.84 | 8.75 | 8.67 |
| API Filtrate (ml/30 min) | 6.00 | 5.40 | 5.80 | 6.20 | 6.10 |
| Chlorides (ppm) | 800 | 850 | 780 | 900 | 900 |
| Mf (ml $H_2SO_4$) | 30 | 26 | 31 | 24 | 24 |
| Marsh Viscosity (seg/qt gal) | 52 | 44 | 48 | 45 | 42 |
| Yield Point (lbs/100 sq ft) | 18 | 14 | 16 | 12 | 11 |

The fluids were then foamed by the addition of citric acid, and the properties of the polymer fluids were determined. Those properties are set forth below in Table 7.

TABLE 7

| Properties of Polymer Fluids (After Foaming) | Fluid 3 | Fluid 4 | Fluid 5 | Fluid 6 | Fluid 7 |
|---|---|---|---|---|---|
| pH | 7.12 | 6.80 | 7.00 | 6.80 | 6.90 |
| Density (lb/gal) | 2.83 | 3.08 | 3.42 | 3.25 | 3.17 |
| API Filtrate (ml/30 min) | 7.4 | 7.7 | 4.6 | 6.4 | 8.8 |
| Chlorides (ppm) | 400 | 300 | 380 | 350 | 370 |
| Pf (ml $H_2SO_4$) | 0 | 0 | 0 | 0 | 0 |
| Mf (ml $H_2SO_4$) | 22.8 | 19.9 | 22.1 | 20.5 | 20.0 |
| Magnesium (mg/l) | 8,000 | 6,000 | 2,400 | 8,000 | 7,500 |

The rheological properties of the foamed fluids then were investigated using a Brookfield Viscometer at 95° F. in accordance with the manufacturer's standard method of determining low shear rate viscosity. The results thereof are set forth below in Table 8.

TABLE 8

| Rotational Velocity (rpm) | Centipoise | | | | |
|---|---|---|---|---|---|
| | Fluid 3 | Fluid 4 | Fluid 5 | Fluid 6 | Fluid 7 |
| 60.0 | 1,346 | 980 | 1,300 | 1,998 | 1,978 |
| 30.0 | 2,390 | 1,580 | 2,320 | 3,320 | 3,352 |
| 12.0 | 5,160 | 3,480 | 5,030 | 6,520 | 6,680 |
| 6.0 | 9,160 | 6,280 | 8,080 | 10,920 | 11,300 |
| 3.0 | 16,600 | 11,160 | 1,200 | 18,320 | 19,080 |
| 1.5 | 29,280 | 21,600 | 25,200 | 30,640 | 32,080 |
| 0.6 | 62,200 | 42,800 | 51,600 | 61,460 | 63,800 |
| 0.3 | 108,800 | 91,200 | 99,200 | 102,800 | 107,600 |

All of the fluids were successfully foamed by the addition of citric acid. It will be noted from the foregoing data that the novel self-generating foamed fluids of the subject invention have relatively low densities as compared to those produced by prior art methods, i.e., from 2.83 to 3.42 lb/gal. Moreover, all of the novel foamed fluids have pH values that are manageable in a drilling environment, i.e., from 6.80 to 7.12. The foamed fluids of the subject invention also exhibit satisfactory physical, chemical, and rheological properties for use as drilling fluids. In particular, Fluids 3, 6, and 7 exhibit excellent physical, chemical, and rheological properties.

Example 4

Physical Properties of Novel Self-Generated Foamed Compositions

Various aqueous polymer fluids were prepared and foamed by the addition of citric acid in accordance with the subject invention. The fluids were similar to those prepared in Example 3 above in that they were aqueous solutions comprising a mix of xantham gum and polyanionic cellulose polymers, calcium carbonate as a fliter cake additive, sodium bicarbonate as a first foam generating agent, magnesium oxide as a rheological and pH stabilizer, and a surfactant, and they were foamed by the addition of citric acid as a second foam generating agent.

The fluids utilized either surfactant A or surfactant B. The relative concentrations of the polymer components were varied to determine the effect thereof on the rheology and thixotropic performance of the foamed fluids. Likewise, the concentrations of other components were varied, and the rheological properties of the fluids after foaming were determined.

The composition of the polymer fluids is set forth below in Table 9.

TABLE 9

| | Concentration (lb/bbl) | | | |
|---|---|---|---|---|
| Components of Polymer Fluids | Fluid 8 (Surf. A) | Fluid 9 (Surf. A) | Fluid 3 (Surf. B) | Fluid 10 (Surf. B) |
| Xantham Gum | 4.0 | 1.0 | 4.0 | 1.0 |
| PAV HV | 1.0 | 4.0 | 1.0 | 4.0 |
| Calcium Carbonate 300 Mesh | 10.0 | 5.0 | 10.0 | 5.0 |
| Sodium Bicarbonate | 10.0 | 5.0 | 10.0 | 5.0 |
| Surfactant A | 4.0 | 4.0 | 0.0 | 0.0 |
| Surfactant B | 0.0 | 0.0 | 4.0 | 4.0 |
| Magnesium Oxide | 2.0 | 1.5 | 2.0 | 1.5 |
| Citric Acid | 4.0 | 4.0 | 4.0 | 4.0 |

The fluids were then foamed by the addition of citric acid, and the rheological properties of the polymer fluids were determined as set forth above in Example 3. Those properties are set forth below in Table 10.

TABLE 10

| | Centipoise | | | |
|---|---|---|---|---|
| Rotational Velocity (rpm) | Fluid 8 (Surf. A) | Fluid 9 (Surf. A) | Fluid 3 (Surf. B) | Fluid 10 (Surf. B) |
| 60.0 | 1,960 | 1,420 | 2,620 | 2,120 |
| 30.0 | 3,404 | 2,980 | 4,340 | 4,300 |
| 12.0 | 7,180 | 6,730 | 9,250 | 8,450 |
| 6.0 | 12,540 | 11,040 | 15,800 | 13,270 |
| 3.0 | 21,680 | 20,320 | 27,200 | 25,300 |
| 1.5 | 37,600 | 34,400 | 45,200 | 44,700 |
| 0.6 | 77,800 | 72,650 | 90,000 | 88,540 |
| 0.3 | 133,200 | 120,200 | 148,000 | 134,800 |

All of the fluids were successfully foamed by the addition of citric acid. It will be appreciated from the foregoing that the self-generating foamed fluids of the subject invention have excellent rheological properties.

Example 5

Chemical and Physical Properties of Novel Self-Generated Foamed Compositions

Various aqueous polymer fluids were prepared and foamed by the addition of citric acid, including Fluid 3 of Example 3 above, in accordance with the subject invention. The remaining fluids were similar to those prepared in Example 3 above in that they were aqueous solutions comprising a mix of xantham gum and polyanionic cellulose polymers, calcium carbonate as a fliter cake additive, sodium bicarbonate as a first foam generating agent, magnesium oxide as a rheological and pH stabilizer, and surfactant B, and they were foamed by the addition of citric acid as a second foam generating agent.

The total and relative concentrations of the polymer components were varied to determine the effect thereof on the rheology of the foamed fluids. Certain fluids, however, incorporated various additives commonly used in drilling fluids, i.e., a clay inhibitor, a biocide, and a corrosion inhibitor, in order to asses the compatibility of those components with the fluids.

The clay inhibitor was a commercially available amine based composition. The biocide was a commercially available glutaraldehyde. The corrosion inhibitor was a commercially available filming amine type inhibitor.

The composition of the polymer fluids is set forth below in Table 11.

TABLE 11

| | Concentration (lb/bbl) | | | |
|---|---|---|---|---|
| Components of Polymer Fluids | Fluid 3 | Fluid 11 | Fluid 12 | Fluid 13 |
| Xantham Gum | 4.0 | 2.0 | 4.0 | 2.0 |
| PAV HV | 1.0 | 4.0 | 1.0 | 4.0 |
| Calcium Carbonate 300 Mesh | 10.0 | 5.0 | 10.0 | 5.0 |
| Sodium Bicarbonate | 10.0 | 5.0 | 10.0 | 5.0 |
| Surfactant B | 4.0 | 4.0 | 4.0 | 4.0 |
| Magnesium Oxide | 2.0 | 1.5 | 2.0 | 1.5 |
| Clay Inhibitor | 0.0 | 0.0 | 5.0 | 5.0 |
| Biocide | 0.0 | 0.0 | 0.5 | 0.5 |

TABLE 11-continued

| | Concentration (lb/bbl) | | | |
|---|---|---|---|---|
| Components of Polymer Fluids | Fluid 3 | Fluid 11 | Fluid 12 | Fluid 13 |
| Corrosion Inhibitor | 0.0 | 0.0 | 0.2 | 0.2 |
| Citric Acid | 4.0 | 4.0 | 4.0 | 4.0 |

The fluids were then foamed by the addition of citric acid, and the rheological is properties of the polymer fluids were determined as set forth above in Example 3. Those properties are set forth below in Table 12.

TABLE 12

| Rotational | Centipoise | | | |
|---|---|---|---|---|
| Velocity (rpm) | Fluid 3 | Fluid 11 | Fluid 12 | Fluid 13 |
| 60.0 | 2,620 | 2,120 | 2,380 | 1,430 |
| 30.0 | 4,340 | 4,300 | 4,040 | 3,560 |
| 12.0 | 9,250 | 8,450 | 8,650 | 5,320 |
| 6.0 | 15,800 | 13,270 | 15,200 | 9,800 |
| 3.0 | 27,200 | 25,300 | 26,200 | 14,300 |
| 1.5 | 45,200 | 44,700 | 43,200 | 32,500 |
| 0.6 | 90,000 | 88,540 | 81,000 | 64,000 |
| 0.3 | 148,000 | 134,800 | 126,000 | 94,780 |

No deleterious effects were observed from the addition of the additives. It will be appreciated, therefore, that the novel self-generating foamed fluids are compatible with conventional additives and that conventional additives do not significantly impair the excellent rheological properties of the foams.

The thermal stability of the foamed fluids then was investigated by hot rolling the foam at 338° F. (170° C.) for a period of 18 hours in a roller oven and otherwise in accordance with API standard test methods, i.e., API-13I. It was observed that the chemical composition of the foams remained unchanged. The rheological properties of the polymer fluids then were determined. Those properties are set forth below in Table 13.

TABLE 13

| Rotational | Centipoises | | | |
|---|---|---|---|---|
| | Before Hot Rolling | | After Hot Rolling | |
| Velocity (rpm) | Fluid 12 | Fluid 13 | Fluid 12 | Fluid 13 |
| 60.0 | 2,380 | 1,430 | 1,380 | 1,120 |
| 30.0 | 4,040 | 3,560 | 2,350 | 2,160 |
| 12.0 | 8,650 | 5,320 | 4,930 | 4,200 |
| 6.0 | 15,200 | 9,800 | 7,960 | 5,740 |
| 3.0 | 26,200 | 14,300 | 8,250 | 7,400 |
| 1.5 | 43,200 | 32,500 | 22,100 | 18,500 |
| 0.6 | 81,000 | 64,000 | 51,800 | 48,000 |
| 0.3 | 126,000 | 94,780 | 89,200 | 78,300 |

As will be appreciated from the foregoing, the novel self-generating foamed fluids of the subject invention exhibit excellent thermal stability.

The foregoing examples demonstrate the excellent physical, chemical, and rheological properties of the novel self-generating foamed fluids of the subject invention and, therefore, their suitability for use in a drilling environment. In particular, they demonstrate that the novel foamed fluids are not only suitable for use as drilling fluids, but that they have sufficiently low densities for use in underbalanced drilling through fragile and low pressure formations.

While this invention has been disclosed and discussed primarily in terms of specific embodiments thereof, it is not intended to be limited thereto. Other modifications and embodiments will be apparent to the worker in the art.

What is claimed is:

1. A method for controlling production of hydrocarbons from a well bore during drilling operations, which method comprises:
   a. providing a drilling fluid, which drilling fluid comprises an aqueous solvent, a. polymer, a surfactant, and a first foam generating agent;
   b. admixing a second foam generating agent into said drilling fluid, whereupon said first and second foam generating agents react to generate a gas within said fluid and thereby to foam said fluid; and
   c. introducing said fluid into said well bore prior to or after admixing said second foam generating agent; and
   d. circulating said fluid through and recovering said fluid from said well bore.

2. The method of claim 1, wherein said first and second foam generating agents react to generate a gas selected from the group consisting of caibon dioxide, oxygen, nitrogen, sulfur dioxide, nitrogen dioxide, and anmonia, and mixtures thereof.

3. The method of claim 1, wherein said polymer is selected from the group consisting of polysaccharides and modified polysaccharides, such as xanthan gum, giar guni, welluni gums, gellan gums, succinoglycan, succinoglycan polysaceharides, scieroglycan, schleroglucan polysaccharides, polyvinylsaccharides, o-carboxychitosans, polyanionic cellulose, carboxyrnethylcellulose, hydroxyethylcelhilose, hydroxypropylcellulose, and modified starches, and mixtures thereof.

4. The method of claim 1, wherein said method comprises admixing said second foam generating agent into said drilling fluid after it has been introduced into said well bore.

5. The method of claim 1, wherein said method comprises:
   a. introducing said drilling fluid comprising said first foam generating agent into said well bore through a drill string extending therethrough;
   b. admixing said second foam generating agent into said drilling fluid after it has been introduced into said drill string;
   c. circulating said drilling fluid through said drill string into the annulus between said drill string and said well bore; and
   d. recovering said drilling fluid from said annulus.

6. The method of claim 5, wherein said method further comprises:
   a. defoaming said drilling fluid after recovery thereof;
   b. recirculating at least a portion of said defoamed drilling fluid into said drill string, with or without the admixture of additional amounts of said first foam generating agent; and
   c. admixing additional amounts of said second foam generating agent into said drilling fluid after it has been recirculated into said drill string.

7. The method of claim 1, wherein said first foam generating agent is present in excess of the amount needed to generate a predetermined amount of gas and the amount of foam generated is controlled by the addition of said second foam generating agent.

8. A method for controlling production of hydrocarbons from a well bore during drilling operations, which method comprises:
   a. pumping a drilling fluid comprising an aqueous solvent, a polymer, a surfactant, and a first foam generating agent into a drill string with a hydraulic pump;
   b. admixing a second foam generating agent into said drilling fluid after said drilling fluid has exited said hydraulic pump, whereupon said first and second foam generating agents react to generate a gas within said fluid and thereby to foam said fluid;
   c. circulating at least a portion of said foamed drilling fluid through said drill string into the annulus between said drill string and said well bore;
   d. recovering said drilling fluid from said annulus.

9. A method for controlling production of hydrocarbons and for removing cuttings from a well bore during drilling operations wbich include the operation of a drill bit on a drill string, which method comprises:
   a. providing a drilling fluid, which drilling fluid comprises an aqueous solvent, a polymer, a surfactant, and a first foam generating agent,
   b. admixing a second foam generating agent into said drilling fluid, whereupon said first and second foam generating agents react to generate a gas within said fluid and thereby to foam said fluid;
   c. introducing said fluid into said drill string prior to or after admixing said second foam generating agent;
   d. circulating at least a portion of said foamed drilling fluid through said drill string into the aimuhis between said drill string and said well bore to carry cuttings from said drill bit away therefrom; and
   e. recovering said drilling fluid and the cuttings carried therein from said annulus.

10. A method for controlling production of hydrocarbons from a well bore during drilling operations, which method comprises:
    a. providing a drilling fluid, which drilling fluid comprises an aqueous solvent, a polymer, a surfactant, and a first foam generating agent;
    b. admixing a second foam generating agent into said drilling fluid, whereupon said first and second foam generating agents react upon admixture to generate a gas within said fluid and thereby to foam said fluid; and
    c. introducing said fluid into said well bore prior to or after admixing said second foam generating agent; and
    d. circulating said fluid through and recovering said fluid from said well bore.

11. The method of claim 10, wherein said drilling operation is a completion operation.

12. The method of claim 10, wherein said drilling operation is a workover operation.

13. The method of claim 10. wherein said driiling operation is a kill operation.

14. A method fbr controlling production of hydrocarbons from an underground formation to a well bore during drilling operations so as to minimize the flow of fluid into or out of said formation, which method comprises:
    a. providing a drilling fluid, which drilling fluid comprises an aqueous solvent, a polymer, a surfactant, and a first foam generating agent;
    b. admixing a second foam generating agent into said drilling fluid, whereupon said first and second foam generating agents react to generate a gas within said fluid and thereby to foam said fluid; and
    c. introducing said fluid into said well bore prior to or after admixing said second foam generating agent; wherein the density of said foamed drilling fluid is selected such that the hydrostatic pressure of fluid in the well bore is approximately equal to the hydrostatic pressure of said formation; and
    d. circulating said fluid through and recovering said fluid from said well bore.

15. The method of claim 1, wherein said first and second foam generating agents react to generate gas which is predominantly carbon dioxide.

16. The method of claim 8, wherein said first and second foam generating agents react to generate gas which is predominantly carbon dioxide.

17. The method of claim 9, wherein said first and second foam generating agents react to generate gas which is predominantly carbon dioxide.

18. The method of claim 10, wherein said first and second foam generating agents react to generate gas which is predominantly carbon dioxide.

19. The method of claim 14, wherein said first and second foam generating agents react to generate gas which is predominantly carbon dioxide.

20. The method of claim 1, wherein said first foam generating agent is selected from the group consisting of acid and neutral salts of alkali metals and alkaline earth metals, and mixtures thereof.

21. The method of claim 8, wherein said first foam generating agent is selected from the group consisting of acid and neutral salts of alkali metals and alkaline earth metals, and mixtures thereof.

22. The method of claim 9, wherein said first foam generating agent is selected from the group consisting of acid and neutral salts of alkali metals and alkaline earth metals, and mixtures thereof.

23. The method of claim 10, wherein said first foam generating agent is selected from the group consisting of acid and neutral salts of alkali metals and alkaline earth metals, and mixtures thereof.

24. The method of claim 1, wherein said second foam generating agent is selected from the group consisting of organic and inorganic acids, and mixtures thereof.

25. The method of claim 8, wherein said second foam generating agent is selected from the group consisting of organic and inorganic acids, and mixtures thereof.

26. The method of claim 9, wherein said second foam generating agent is selected from the group consisting of organic and inorganic acids, and mixtures thereof.

27. The method of claim 10, wherein said second foam generating agent is selected from the group consisting of organic and inorganic acids, and mixtures thereof.

28. The method of claim 20, wherein said second foam generating agent is selected from the group consisting of organic and inorganic acids, and mixtures thereof.

29. The method of claim 21, wherein said second foam generating agent is selected from the group consisting of organic and inorganic acids, and mixtures thereof.

30. The method of claim 1, wherein said drilling fluid has a density of from about 5.8 lb/gal to about 0.83 lb/gal.

31. The method of claim 8, wherein said drilling fluid has a density of from about 5.8 lb/gal to about 0.83 lb/gal.

32. The method of claim 9, wherein said drilling fluid has a density of from about 5.8 lb/gal to about 0.83 lb/gal.

33. The method of claim 10, wherein said drilling fluid has a density of from about 5.8 lb/gal to about 0.83 lb/gal.

34. The method of claim 14, wherein said drilling fluid has a density of from about 5.8 lb/gal to about 0.83 lb/gal.

35. The method of claim 15, wherein said drilling fluid has a density of from about 5.8 lb/gal to about 0.83 lb/gal.

36. The method of claim 1, wherein said drilling fluid has a density of from about 3.3 lb/gal to about 0.83 lb/gal.

37. The method of claim 8, wherein said drilling fluid has a density of from about 3.3 lb/gal to about 0.83 lb/gal.

38. The method of claim 9, wherein said drilling fluid has a density of from about 3.3 lb/gal to about 0.83 lb/gal.

39. The method of claim 10, wherein said drilling fluid has a density of from about 3.3 lb/gal to about 0.83 lb/gal.

40. The method of claim 14, wherein said drilling fluid has a density of from about 3.3 lb/gal to about 0.83 lb/gal.

41. The method of claim 1, wherein said first foam generating agent is selected fi-orn the group consisting of sodium bicarbonate, potassium bicarbonate, calcium bicarbonate, barium bicarbonate, and lithium bicarbonate, arid mixtures thereof.

42. The method of claim 8, wherein said first foam generating agent is selected from the group consisting of sodium bicarbonate, potassium bicarbonate, calcium bicarbonate, barium bicarbonate, and lithium bicarbonate, and mixtures thereof.

43. The method of claim 9, wherein said first foam generating agent is selected from the group consisting of sodium bicarbonate, potassium bicarbonate, calcium bicarbonate, barium bicarbonate, and lithium bicarbonate, and mixtures thereof.

44. The method of claim 10, wherein said first foam generating agent is selected from the group consisting of sodium bicarbonate, potassium bicarbonate, calcium bicarbonate, barium bicarbonate, and lithium bicarbonate, and mixtures thereof.

45. The method of claim 14, wherein said first foam generating agent is selected from the group consisting of sodium bicarbonate, potassium bicarbonate, calcium bicarbonate, barium bicarbonate, and Littilum bicarbonate, and mixtures thereof.

46. The method of claim 30, wherein said first foam generating agent is selected from the group consisting of sodium bicarbonate, potassium bicarbonate, calcium bicarbonate, barium bicarbonate, and lithium bicarbonate, and mixtures thereof.

47. The method of claim 35, wherein said first foam generating agent is selected from the group consisting of sodium bicarbonate, potassium bicarbonate, calcium bicarbonate, barium bicarbonate, and lithium bicarbonate, and mixtures thereof.

48. The method of claim 1, wherein said second foam generating agent is selected from the group consisting of carboxylic acids, acetic acids, acetyl salicylic acids, ascorbic acids, citric acids, lactic acids, tartaric acids, gluconic acids, plienyl glycolic acids, benzylic acids, malic acids, salicylic acids, acetyl salicylic acids, formic acids, propionic acids, butyric acids, oleic acids, linoleic acids, linolenic acids, sorbic acids, benzoic acids, phenyl acetic acids, gallic acids, oxylacetic acids, valeric acids, palinitic acids, fatty acids, vaiproic acids, acrylic acids, and methacrylic acids, and mixtures thereof.

49. The method of claim 8, wherein said second foam generating agent is selected from the group consisting of carboxylic acids, acetic acids, acetyl salicylic acids, ascorbic acids, citric acids, lactic acids, tartaxic acids, gluconic acids, phenyl glycolic acids, benzylic acids, malic acids, salicylic acids, acetyl salicylic acids, formic acids, propionic acids, butyric acids, oleic acids, linoleic acids, linolenic acids, sorbic acids, benzoic acids, phenyl acetic acids, gallic acids, oxylacetic acids, valeric acids, palmitic acids, fatty acids, vaiproic acids, acrylic acids, and methacrylic acids, and mixtures thereof.

50. The method of claim 9, wherein said second foam generating agent is selected from the group consisting of carboxylic acids, acetic acids, acetyl salicylic acids, ascorbic acids, citric acids, lactic acids, tartaric acids, gluconic acids, phenyl glycolic acids, benzylic acids, malic acids, salicylic acids, acetyl salicylic acids, formic acids, propionic acids, butyric acids, oleic acids, linoleic acids, linolenic acids, sorbic acids, benzoic acids, phenyl acetic acids, gallic acids, oxylacetic acids, valeric acids, palmitic acids, fatty acids, vaiproic acids, acrylic acids, and methacrylic acids, and mixtures thereof.

51. The method of claim 10, wherein said second foam generating agent is selected from the group consisting of carboxylic acids, acetic acids, acetyl salicylic acids, ascorbic acids, citric acids, lactic acids, tartaric acids, gluconic acids. phenyl glycolic acids, benzylic acids, malic acids, salicylic acids, acetyl salicylic acids, formic acids, propionic acids, butyric acids, oleic acids, linoleic acids, lmolenic acids; sorbic acids, benzoic acids, phenyl acetic acids, gallic acids, oxylacetic acids, valeric acids, palmitic acids, fatty acids, vaiproic acids, acrylic acids, and metbacrylic acids, and mixtures thereof.

52. The method of claim 14, wherein said second foam generating agent is selected from the group consisting of carboxylic acids, acetic acids, acetyl salicylic acids, ascorbic acids, citric acids, lactic acids, tartaric acids, gluconic acids, phenyl glycolic acids, benzylic acids, malic acids, salicylic acids, acetyl salicylic acids, formic acids, propioiuc acids, butyric acids, oleic acids, linoleic acids, linolenic acids, sorbic acids, benzoic acids, phenyl acetic acids, gallic acids, oxylacetic acids, valerie acids, palniitic acids, fatty acids, vaiproic acids, acrylic acids, and methacrylic acids, and mixtures thereof.

53. The method of claim 30, wherein said second foam generating agent is selected from the group consisting of carboxylic acids, acetic acids, acetyl salicylic acids, ascorbic acids, citric acids, lactic acids, tartaric acids, gluconic acids, phenyl glycolic acids, benzylic acids, malic acids, salicylic acids, acetyl salicylic acids, formic acids, propiomc acids, butyric acids, oleic acids, linoleic acids, linolenic acids, sorbic acids, benzoic acids, pheriyl acetic acids, gallic acids, oxylacetic acids, valeric acids, palinkic acids, fatty acids, vaiproic acids, acrylic acids, and niethaciylic acids, and mixtures thereof.

54. The method of claim 41, wherein said second foam generating agent is selected from the group consisting of carboxylic acids, acetic acids, acetyl salicylic acids, ascorbic acids, citric acids, lactic acids, tartaric acids, glucoriic acids, phenyl glycolic acids, beazylic acids, malic acids, salicylic acids, acetyl salicylic acids, formic acids, propioruc acids, butyric acids, oleic acids, linoleic acids, linolenic acids, sorbic acids, benzoic acids, phenyl acetic acids, gallic acids, oxylacetic acids. valeric acids, patmitic acids, fatty acids, vaiproic acids, acrylic acids, and methacrylic acids, and mixtures thereof.

55. The method of claim 42, wherein said second foam generating agent is selected from the group consisting of carboxylic acids, acetic acids, acetyl salicylic acids, ascorbic acids, citric acids, lactic acids, tartaric acids, gluconic acids, phenyl glycolic acids, benzylic acids, malic acids, salicylic acids, acetyl salicylic acids, formic acids, propionic acids, butyric acids, oleic acids, linoleic acids, linolenic acids, sorbic acids, benzoic acids, phenyl acetic acids, gallic acids, oxylacetic acids, valeric acids, palmitic acids, fatty acids, valproic acids, acrylic acids, and methacrylic acids, and mixtures thereof.

56. The method of claim 43, wherein said second foam generating agent is selected front the group consisting of carboxylic acids, acetic acids, acetyl salicylic acids, ascorbic acids, citric acids, lactic acids, tartaric acids, glucome acids, phenyl glycolic acids, benzylic acids, nialic acids, salicylic acids, acetyl salicylic acids, formic acids, propiome acids, butyric acids, oleic acids, linoleic acids, linolenic acids, sorbic acids, beuzoic acids, phenyl acetic acids, gallic acids, oxylacetic acids, valerie acids, palniitic acids, fatty acids, vaiproic acids, acrylic acids, and methacrylic acids, and mixtures thereof.

57. The method of claim 44, wherein said second foam generating agent is selected from the group consisting of carboxylic acids, acetic acids, acetyl salicylic acids, ascorbic acids, citric acids, lactic acids, tartaric acids, gluconic acids, phenyl glycolic acids, benzylic acids, malic acids, salicylic acids, acetyl salicylic acids, formic acids, propionic acids, butyric acids, oleic acids, linoleic acids, linolenic acids, sorbic acids, benzoic acids, phenyl acetic acids, gallic acids, oxylacetic acids, valerie acids, paimitic acids, fatty acids, vaiproic acids, acrylic acids, and metbacrylic acids, and mixtures thereof.

58. The method of claim 45, wherein said second foam generating agent is selected from the group consisting of carboxylic acids, acetic acids, acetyl saiicylic acids, ascorbic acids, citric acids, lactic acids, tartaric acids, gluconic acids, phenyl glycolic acids, benzylic acids, malic acids, salicylic acids, acetyl salicylic acids, formic acids, propionic acids, butyric acids, oleic acids, linoleic acids, linolenic acids, sorbic acids, benzoic acids, phenyl acetic acids, gallic acids, oxylacetic acids, valeric acids, palinitic acids, fatty acids, vaiproic acids, acrylic acids, and methacrylic acids, and mixtures thereof.

59. The method of claim 47, wherein said second foam generating agent is selected from the group consisting of carboxylic acids, acetic acids, acetyl salicylic acids, ascorbic acids, citric acids, lactic acids, tartaric acids, gluconic acids, phenyl glycolic acids, benzylic acids, malic acids, salicylic acids, acetyl salicylic acids, formic acids, propionic acids, butyric acids, oleic acids, linoleic acids, linolenic acids, sorbic acids, benzoic acids, phenyl acetic acids, gallic acids, oxylacetic acids, valeric acids, palmitic acids, fatty acids, vaiproic acids, acrylic acids, and methacrylic acids, and mixtures thereof.

60. The method of claim 51, wherein said second foam generating agent is selected from the group consisting of carboxylic acids, acetic acids, acetyl salicylic acids, ascorbic acids, citric acids, lactic acids, tartaric acids, gluconic acids, phenyl glycolic acids, benzylic acids, rnalic acids, salicylic acids, acetyl salicylic acids, formic acids, propionic acids, butyric acids, oleic acids, linoleic acids, linolenic acids, sorbic acids, bemzoic acids, phenyl acetic acids, gallic acids, oxylacetic acids, valeric acids, palmitic acids, fatty acids, vaiproic acids, acrylic acids, and methacrylic acids, and mixtures thereof.

* * * * *

UNITED STATES PATENT AND TRADEMARK OFFICE
CERTIFICATE OF CORRECTION

PATENT NO.        : 7,199,083 B2
APPLICATION NO.   : 10/313344
DATED             : April 3, 2007
INVENTOR(S)       : Manuel Legendre Zevallos It is certified that error appears in the above-identified patent and that said Letters Patent is hereby corrected as shown below:

In col. 3, at line 30, delete "thioxotropic" and insert therein -- thixotropic --.

In col. 5, at line 52, delete "schleroglucan" and insert therein -- scleroglucan --.

In col. 6, at line 35, immediately after "and", delete "is".

In col. 12, at line 20, delete "xantham" and insert therein -- xanthan --.

In col. 12, at line 21, delete "fliter" and insert therein -- filter --.

In col. 12, in Table 2, delete "Xantham" and insert therein -- Xanthan --.

In col. 13, at line 59, delete "xantham" and insert therein -- xanthan --.

In col. 13, at line 60, delete "fliter" and insert therein -- filter --.

In col. 14, in Table 5, delete "Xantham" and insert therein -- Xanthan --.

In col. 15, at line 37, delete "xantham" and insert therein -- xanthan --.

In col. 15, at line 38, delete "fliter" and insert therein -- filter --.

In col. 15, in Table 9, delete "Xantham" and insert therein -- Xanthan --.

In col. 16, at line 35, delete "xantham" and insert therein -- xanthan --.

In col. 16, at line 36, delete "fliter" and insert therein -- filter --.

In col. 16, line Table 11, delete "Xantham" and insert therein -- Xanthan --.

In claim 1, at col. 18, line 13, delete "a.", and insert therein -- a --.

In claim 2, at col. 18, line 25, delete "caibon" and insert therein -- carbon --.

In claim 2, at col. 18, line 26, delete "animonia" and insert therein -- ammonia --.

In claim 3, at col. 18, line 30, delete "giar guni" and insert therein -- guar gum --.

In claim 3, at col. 18, line 32, delete "polysaceharides, scieroglycan, schleroglucan" and insert therein -- polysaccharides, scleroglycan, scleroglycan --.

UNITED STATES PATENT AND TRADEMARK OFFICE
CERTIFICATE OF CORRECTION

PATENT NO.         : 7,199,083 B2
APPLICATION NO. : 10/313344
DATED                 : April 3, 2007
INVENTOR(S)       : Manuel Legendre Zevallos It is certified that error appears in the above-identified patent and that said Letters Patent is hereby corrected as shown below:

In claim 3, at col. 18, line 34, delete "carboxyrnethylcellulose, hydroxyethylcelhilose" and insert therein -- carboxymethylcellulose, hydroxyethylcellulose --.

In claim 9, at col. 19, line 18, delete "wbich" and insert therein -- which --.

In claim 9, at col. 19, line 30, delete "aimuhis" and insert therein -- annulus --.

In claim 13, at col. 19, line 53, delete "driiling" and insert therein -- drilling --.

In claim 14, at col. 19, line 55, delete "fbr" and insert therein -- for --.

In claim 41, at col. 21, line 12, delete "fi-orn" and insert therein -- from --.

In claim 41, at col. 21, line 14, delete "arid" and insert therein -- and --.

In claim 45, at col. 21, line 45, delete "Littilum" and insert therein -- lithium --.

In each of claims 48 through 60, correct the numerous errors in chemical names by replacing the text commencing on the third line of each said claim and continuing through the end of each said claim with the following text:

UNITED STATES PATENT AND TRADEMARK OFFICE
CERTIFICATE OF CORRECTION

PATENT NO. : 7,199,083 B2
APPLICATION NO. : 10/313344
DATED : April 3, 2007
INVENTOR(S) : Manuel Legendre Zevallos It is certified that error appears in the above-identified patent and that said Letters Patent is hereby corrected as shown below:

In each of claims 48 through 60 (cont'd),

-- carboxylic acids, acetic acids, acetyl salicylic acids, ascorbic acids, citric acids, lactic acids, tartaric acids, gluconic acids, phenyl glycolic acids, benzylic acids, malic acids, salicylic acids, acetyl salicylic acids, formic acids, propionic acids, butyric acids, oleic acids, linoleic acids, linolenic acids, sorbic acids, benzoic acids, phenyl acetic acids, gallic acids, oxylacetic acids, valeric acids, palmitic acids, fatty acids, valproic acids, acrylic acids, and methacrylic acids, and mixtures thereof. --.

Signed and Sealed this

Twenty-first Day of August, 2007

JON W. DUDAS
*Director of the United States Patent and Trademark Office*